March 17, 1964  J. O. PUNDERSON  3,125,551
PROCESS FOR ESTERIFYING POLYOXYMETHYLENE GLYCOL WITH
VAPORS OF AN ORGANIC CARBOXYLIC ACID ANHYDRIDE
Filed March 9, 1959
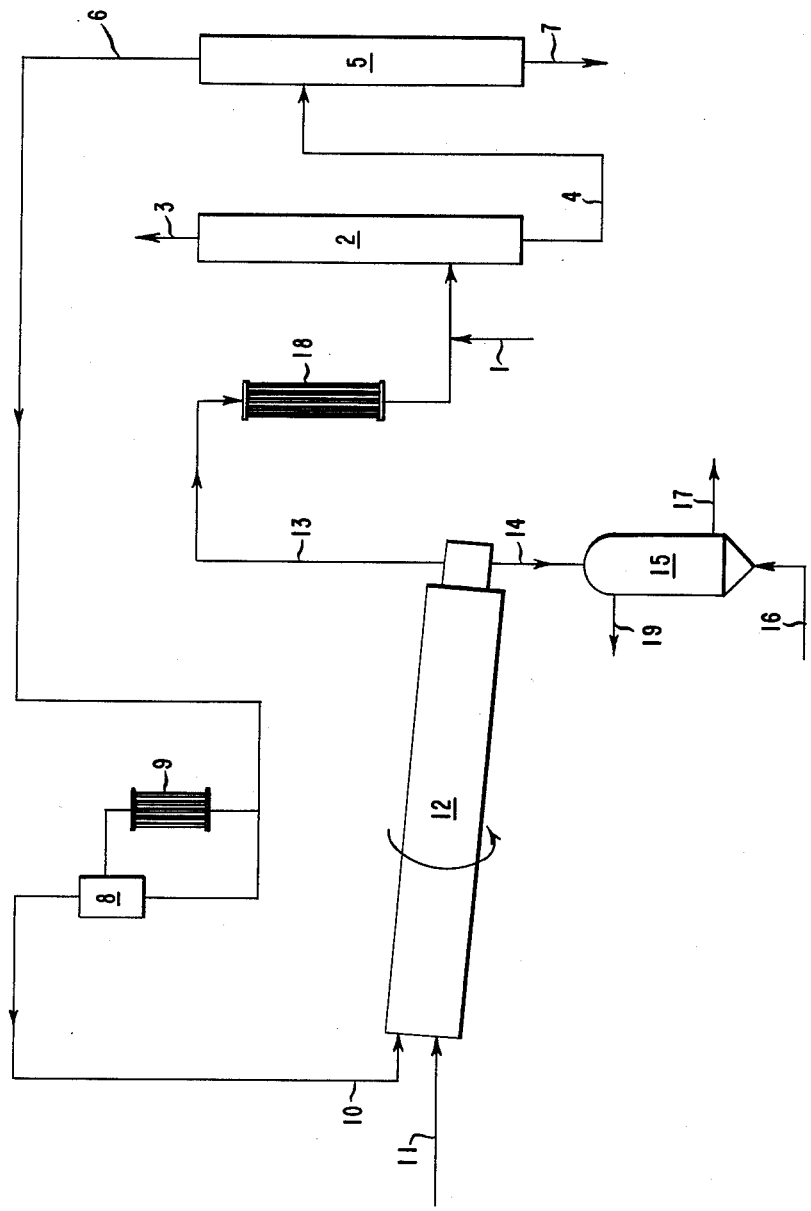
INVENTOR
JOHN OLIVER PUNDERSON
BY *Earl L. Tyner Jr.*
ATTORNEY

United States Patent Office 3,125,551
Patented Mar. 17, 1964

3,125,551
PROCESS FOR ESTERIFYING POLYOXYMETHYLENE GLYCOL WITH VAPORS OF AN ORGANIC CARBOXYLIC ACID ANHYDRIDE
John Oliver Punderson, Wilmington, Del., assignor to E. I. du Pont de Nemours and Company, Wilmington, Del., a corporation of Delaware
Filed Mar. 9, 1959, Ser. No. 798,274
2 Claims. (Cl. 260—67)

This invention relates to a process for esterifying high molecular weight polyoxymethylene, and, more particularly, it relates to a process in which a high molecular weight polyoxymethylene glycol is esterified by treatment with vapors of an organic carboxylic acid anhydride.

It has been shown in copending application Serial No. 681,188, filed August 30, 1957, now Patent No. 2,998,409, by S. Dal Nogare and J. O. Punderson, that polyoxymethylene, having at least one of the two ends of the polymer chain terminated by a hydroxyl group, may be esterified by treatment with an organic carboxylic acid anhydride in the presence of a tertiary amine as a catalyst. This copending application illustrates the process in variations in which the polymer is treated: (1) while dispersed in a liquid medium which is a non-solvent for the polymer, (2) while disssolved in a liquid solvent for the polymer, or (3) with vapors of the anhydride and catalyst. The procedures of (1) and (2) above are eminently satisfactory in that the process produces a desirable esterified product, but these procedures require large amounts of anhydride per unit weight of polymer (approximately 15:1). The procedure of (3) requires smaller amounts of anhydride, but the mixture of anhydride and the amine catalyst are not easily separated because of the formation of azeotropes, and, accordingly, the anhydride cannot be recovered by inexpensive procedures. In the copending application Serial No. 763,842 filed by S. H. Jenkins and J. O. Punderson on September 29, 1958, now Patent No. 2,964,500, there is disclosed and claimed a process for esterifying polyoxymethylene with a carboxylic acid anhydride and a nonvolatile catalyst such as an alkali metal acetate. This procedure eliminates the possibility of forming an azeotrope in the recovery of the anhydride, but it is not as economical as a vapor process because it utilizes more anhydride. Furthermore, in any process involving a catalyst, the polymer product must be washed thoroughly to remove as much of the catalyst from the product as possible because traces of catalyst result in a poorer thermal stability in the polymer product. The non-volatile catalyst is, of course, somewhat more difficult to remove than is the volatile catalyst. The process of the present invention provides an improved vapor process which does not require a catalyst, and, accordingly, is more economical and does not require any steps of washing out a catalyst, and at the same time, the present process produces an esterified polyoxymethylene with a high degree of thermal stability and a high yield of product.

It is an object of this invention to provide an improved vapor process for preparing a high molecular weight polyoxymethylene carboxylate from a high molecular weight polyoxymethylene having at least one of the two ends of the polymer chain terminated by a hydroxyl group. It is another object of this invention to provide an integrated continuous process for esterifying the two hydroxyl groups of a high molecular weight polyoxymethylene glycol by treatment with the vapors of an organic carboxylic acid anhydride, followed by recovery, refining and recycling of the anhydride. It is a specific object of this invention to provide a process of acetylating the hydroxyls of a high molecular weight polyoxymethylene glycol by treatment with acetic anhydride vapors followed by a recovery, refining, and recycling system for the acetic anhydride.

The above objects are accomplished by a process in which a particulate polyoxymethylene starting material, having a number average molecular weight of at least 10,000, and having at least one of the two ends of its polymer chain terminated by a hydroxyl group, is moistened or wetted with an organic carboxylic anhydride and then is intimately contacted with a continuously flowing stream of vapors of the said organic carboxylic acid anhydride at a temperature not exceeding 170° C. The polymer, in the form of a static or fluidized bed or as tumbling particles, is thoroughly mixed with the vapors of the acid anhydride for a time sufficient to permit substantially all of the said hydroxyl groups on the starting material to be converted to carboxylic acid ester groups corresponding chemically to the said anhydride.

In the preferred process of this invention, the polyoxymethylene glycol, initially at a temperature of about 25° C. to 75° C., is tumbled in an atmosphere of acetic anhydride vapors at a temperature of 140°–165° C., while the polymer is being heated to a temperature of 130°–170° C., for a time sufficient to permit the hydroxyl groups on the polymer chain to be converted to acetate groups. The reaction products comprise unreacted acetic anhydride vapors contaminated with acetic acid, polyoxymethylene diacetate, and any impurities or by-products generated during the esterification reaction. The polymeric product is dried by sparging it with an inert gas such as nitrogen, which removes substantially all of the absorbed anhydride and other volatile materials adsorbed on the surface of the polymer. The acetic anhydride vapors, containing acetic acid and methylene diacetate as impurities, may be purified and recycled through the process by any of many procedures. One preferred system is that in which the impure acetic anhydride is passed through a refining operation comprising a condenser to liquefy the vapors, followed by a first distillation step to remove overhead acetic acid vapors and to produce a liquid tails stream which is subjected to a second distillation step in which methylene diacetate is separated as a liquid tails product, and acetic anhydride of at least 95% purity is produced as an overhead vapor.

There are some important features in the process of this invention which should be explained for a complete understanding of how to obtain optimum results. It has been found that the presence of free carboxylic acid, e.g., acetic acid, promotes the degradation of polyoxymethylene chains terminated with a hydroxyl group. Acid may be present in the process of this invention for any of several reasons, e.g. the reaction of the anhydride with the hydroxyl group at the end of the polymer chain forms the corresponding acid as a by-product, the presence of water in the reaction system will form acid by hydrolysis of the anhydride, and acid may be present as an impurity in the reactants employed in this process. In order to obtain a good recovery of polyoxymethylene dicarboxylate, it has been determined that the concentration of acid in the anhydride vapors should never exceed 10% by weight during any time that the anhydride vapors are in the reaction zone, and preferably the concentration should be as low as possible, although it is uneconomical to maintain the acid concentration essentially at zero. It has been determined that a concentration of about 0.1% to 5.0% will permit the percentage recovery of polymer product to be from about 90% to 99% or better, and so this constitutes the preferred range.

In a continuous process the flow rate of the anhydride through the reaction zone is an important variable for controlling the concentration of acid in the anhydride vapors. The flow rate may, of course, be changed by altering the proportionate amounts of total anhydride and total polymer in the reaction zone. Generally, these amounts may vary from about 0.05 to 5.0 parts of anhydride per part of polymer. Greater amounts of anhydride may be used without any undesirable effects, but it is uneconomical to employ more than about 5.0 parts of anhydride per part of polymer. Preferably, this range is from about 0.25 to 2.0 for best results with optimum usage of reactants. As will be explained hereinafter, some of the anhydride falling within the amounts just mentioned may be liquid anhydride used to wet the surfaces of the polymer while the remaining anhydride will be in the vapor phase. Polymers of higher and higher molecular weights produce less and less acid per unit weight of polymer because of the fact that there are never more than two hydroxyls on any molecule of polyoxymethylene, regardless of molecular weight. Thus, the build-up of acid is not so serious in a process using polymer of high molecular weight.

Another unexpected and critical feature of this invention is that the polymer must be moistened or wetted with anhydride in order for the reaction to proceed substantially to completion at a rate fast enough to minimize loss of polymer to side reactions. It has been found that when a catalyst is omitted from the reaction the use of the reactant anhydride as a vapor in the process of this invention produces higher recoveries of product than the same process modified to the extent that the anhydride is used as a liquid. Furthermore, even greater improvement in the recovery is found when the polymer is wetted with liquid anhydride before being contacted with anhydride vapors. The wetting of the polymer may be accomplished in several ways, e.g. liquid anhydride may be applied to the polymer prior to the time when it is fed into the reaction zone. A more convenient way, however, is to introduce the polymer at a low temperature into the reaction zone to be contacted with the vapors of anhydride, causing some of the anhydride to condense on the surface of the polymer particles. Sufficient heat is supplied to the reaction zone to revaporize the original condensate before the polymer is ready to leave the reaction zone.

Although, as stated above, it is a critical feature of this invention to employ polymer moistened or wetted with anhydride, the amount of liquid to solid in the wetted polymer is not critical. The weight ratio of liquid anhydride to dry polymer should, in any case, be at least about 0.05:1.0. In the normal practice of this process this weight ratio will be from about 0.1:1.0 to about 1:1. Higher ratios of liquid anhydride to dry polymer can be used without any serious disadvantages other than the economical disadvantage of employing more anhydride than is needed. However, in the process of this invention it is intended that the ratio of anhydride to polymer in the wet polymer mass shall never be so high as to cause the wetted polymer to have the physical characteristics of a mobile liquid slurry. The wetted polymer is intended to be one that retains the essential properties of a granular or particulate solid as distinguished from the fluid properties of a liquid. The amounts of anhydride and polymer cited here (i.e. 0.05:1 to 1:1) represent a portion of the total anhydride and polymer specified previously (i.e. 0.05 to 5.0 parts of anhydride per part of polymer).

The preferred process of this invention may be more fully understood by reference to the attached drawing. The organic carboxylic acid anhydride referred to in the following description is acetic anhydride since it is the preferred reactant. Fresh acetic anhydride is added to the system at 1, and flows into topping still 2 which removes via overhead stream 3 low boilers from the acetic anhydride. The principal low boiling impurities are monomeric formaldehyde and acetic acid. If a low boiling liquid, such as toluene, is used in the previous step of polymerizing formaldehyde, small amounts of toluene are normally carried by the polymer into the present process, and are removed via the overhead of the topping still 2. The tails stream 4 of still 2 is then introduced into refiner 5, which serves the function of removing high boiling components, chiefly methylene diacetate, in tails stream 7, and producing an overhead vapor stream 6 which is the refined acetic anhydride to be used in esterification reaction. The vapor stream 6 may be returned directly to the acetylation reactor, although it is usually desirable to condense the purified anhydride into a storage vessel in the line between refiner 5 and vaporizer 9. Such a storage vessel is not shown on the attached drawing. The purified anhydride stream is then passed through vaporizer 9 and liquid separator 8 in order to vaporize the entire stream, and normally to bring the vapor up to a temperature of about 140°–165° C. The acetic anhydride vapor is then fed cocurrently into tumbler 12 along with unesterified polyoxymethylene entering the tumbler at 11.

The polyoxymethylene in feed stream 11 is a high molecular weight polyoxymethylene having a terminal group at each end of the polymer chain, at least one of the two terminal groups being a hydroxyl group. The term "polyoxymethylene" as used herein is intended to be synonymous with a polymer formed by the addition polymerization of formaldehyde, the polymer being characterized by having the general formula:

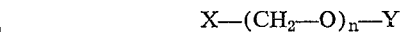

where X and Y are terminal groups or "end groups." For example, if X is a hydroxyl and Y is a hydrogen, the oxymethylene chain $-(CH_2O)_n-$ is terminated by a hydroxyl at each end of the chain, and the polymer is known as polyoxymethylene glycol. If X is

and Y is

each end of the chain is terminated by an acetate group, and the polymer is known as polyoxymethylene diacetate. In order for the polyoxymethylene to be employed as a starting material in the process of this invention there must be at least one of the two terminal groups which is a hydroxyl. Therefore, the starting material may be visualized by the formula

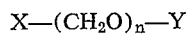

where X is hydroxyl and Y is hydrogen or any group capable of being formed on the end of a polyoxymethylene chain. Since the polyoxymethylenes which have desirable physical properties are those having a number average molecular weight of at least 10,000, and preferably at least 20,000, $n$ in the above formula may be any integer greater than about 330, and preferably greater than about 670. The product of this process normally will have substantially the same number average molecular weight as that of the starting material, although some decrease may be noted due to a small amount of degradation of the polymer being processed. Normally, this amount is negligible because it is within the limits of error experienced in measuring the molecular weight.

The stream of polymer at 11 and the stream of acetic anhydride vapor at 10 enter tumbler 12, and react to form an acetate group in place of each available hydroxyl group originally on the polymer. The polymer entering at 11 is preferably at a temperature of about 25°–75° C. in order to cause the hot anhydride vapor to condense on the surface of the polymer and thereby to wet the surface. The exact temperature of the polymer is not critical since a temperature differential should be maintained which is sufficient to permit condensation of the anhydride vapors and thereby to wet the polymer surface. The relatively cool polymer and the relatively hot acetic achydride vapors, preferably at a temperature of 140°–165° C., are immediately mixed upon entrance into the tumbler 12. This mixing causes some of the anhydride to be temporarily condensed on the surface of the polymer. The condensate is revaporized at some later stage of its travel through tumbler 12, which is an inclined rotary tumbler through which the polymer advances by reason of the interior tumbling motion and the inclination of the axis of the tumbler. The revaporization is accomplished by supplying heat to the tumbler. Preferably, the heat is sufficient not only to revaporize the anhydride, but also to bring the temperature of the polymer solids up to 130°–170° C. The wetting of the polymer surface has been found to be beneficial in accelerating the esterification reaction, although the reason for this result is not entirely understood. It may be that a portion of the explanation of this result is that the wet polymer surface makes it easier for the anhydride to diffuse into the polymer particle and to react with the hydroxyl end-groups, than would be the case if the dry polymer were contacted with dry vapor.

The pressure in tumbler 12 is not critical, but the reaction is generally carried out at about atmospheric pressure for reasons of convenience. Higher pressures require better seals on the tumbler to prevent leakage of anhydride vapors, and lower pressures introduce the possibility of drawing oxygen into the reaction zone from the atmosphere if there are any leaks in the system. In some experimental runs it has been determined that the partial pressure of the anhydride vapor may have been reduced to less than 0.5 atmosphere by using a mixture of an inert diluent gas, such as nitrogen or cyclohexane with the anhydride vapor. Pressures of anhydride vapors may be superatmospheric, but if the vapor temperature exceeds about 170° C., care should be exercised to see that the temperature of the polyoxymethylene does not go this high, since it is at this point that the polymer begins to melt.

At the exit end of the tumbler 12, acetic anhydride vapors pass into stream 13 and the esterified polymer passes through line 14 into the top of sparger 15. Into the bottom of sparger 15 there is introduced an inert gas such as dry nitrogen at such a rate that the falling polymer is converted into a fluidized bed of solid polymer particles. This inert gas leaves sparger 15 through line 19 and carries with it substantially all of the unreacted acetic anhydride and any by-products adsorbed on the surface of the polymer particles leaving the tumbler 12. The gas in line 19 may be discarded or may be stripped of the impurities picked up in sparger 15 and recycled into stream 16. The polymer leaving sparger 15 through line 17 is referred to as "capped polymer" because substantially all of the original hydroxyl groups terminating the polymer chain have been replaced by acetate groups. Since the hydroxyl group is relatively unstable to thermal effects, while the acetate is stable to thermal effects, the polymer is said to be "capped" when a stable end-group is incorporated onto the polymer chain to prevent the unraveling, or depolymerization, of the polymer which occurs rather easily when the end-groups are hydroxyl groups.

The unreacted anhydride in stream 13 is passed through condenser 18, and thence into topping still 2 along with make-up anhydride from stream 1, to begin the refining steps described above. It may sometimes be desirable to pass the vapors in stream 13 directly into still 2 without being condensed.

The following example serves to illustrate the process of this invention. Fifty grams of a polyoxymethylene glycol having a number average molecular weight of 43,000 was placed in a cylindrical glass reactor 3 inches in diameter and approximately 20 inches long. To the polymer was added 115 grams of acetic anhydride having an acetic acid content of 0.19% by weight. The reactor was placed in a horizontal position and rotated on its axis at a rate sufficient to tumble the anhydride-wet polymer. A stream of nitrogen was passed through the rotating reactor for a period of 20 minutes to sweep out oxygen. The reactor was heated by an air bath, and a stream of acetic anhydride vapors from an external vaporizer unit was passed through the reactor. During a period of 52 minutes 46 ml. of liquid acetic anhydride (containing 0.19% acetic acid) was vaporized and passed through the rotating reactor. The temperature within the reactor rose from 50° C. to 159° C. during this interval. The reaction was continued for one hour at 159° C., during which time an additional 34 ml. of liquid acetic anhydride was fed to the vaporizer. Nitrogen, at a rate of 2 liters per minute, was then passed through the rotating reactor while it was allowed to cool to room temperature. A dry polyoxymethylene diacetate was recovered, having essentially the same number average molecular weight as the starting material. The polymer recovery was 96.6%, and the polymer exhibited a reaction rate constant for thermal degradation at 222° C. of less than 0.05% by weight per minute.

Other types of reactors have been found to be equally operable. For example, the process of this invention was successfully operated with a "fixed-bed" system in which an immovable bed of particulate polyoxymethylene starting material is contacted with vapors of a carboxylic acid passing through the bed. In still another alternative procedure employing the "fluidized-bed" system powdered polyoxymethylene starting material is fed into the top of a reactor while the anhydride vapors are fed into the bottom of the reactor, the vapors passing countercurrently to the polymer particles at a velocity such that the powdered particles are agitated.

It is, of course, to be understood that other organic carboxylic acid anhydrides than acetic anhydride may be employed in this process by altering the conditions of temperature of stream 10 and by correspondingly changing the temperatures and pressures in topping still 2 and refiner 5. The temperature of the anhydride vapor usually will be maintained below about 170° C. because the polymer melts at about 175°–180° C., and, therefore, the temperature, pressure, and composition of stream 10 may be varied in order that 170° C. is not exceeded. As specific examples of such other operable anhydrides, there may be mentioned the anhydrides of aliphatic carboxylic acids having 2–6 carbon atoms per acid molecule, e.g. propionic acid anhydride, butyric acid anhydride, pentanoic acid anhydride, hexanoic acid anhydride, and mixed anhydrides such as acetic propionic acid anhydride. The use of anhydrides higher boiling than propionic is not the most desirable because lower and lower partial pressures of the anhydride are required in order to maintain the reaction temperature below about 170° C. Any of the above acid anhydrides may be substituted with such an inert group as a halogen, a nitrile, a cyanide group, or the like, and still be operable within this process. The unsubstituted anhydrides are preferred, however, because of their availability and their lower cost.

The polyoxymethylene starting material may be made by any of several procedures for polymerizing formaldehyde. The polymerization product of such procedures is that described and claimed in U.S. Patent 2,768,994, issued October 30, 1956, to R. N. MacDonald.

The relative amounts of anhydride and polyoxymethylene employed as starting materials in this process are not too critical, although the amount of anhydride normally used is considerably in excess of the stoichiometric requirements for the reaction. A convenient working ratio has been found to be from about 0.25 to 2.0 part by weight of anhydride per part of polymer. More anhydride may be used if economy is not a consideration.

As an illustration of the continuous operation of this process, the following description is provided. Acetic anhydride vapor at 140°–150° C. and 1 atmosphere pressure is introduced through line 10 into a heated tumbler 12 along with granules of polyoxymethylene glycol through line 11. Substantially equal weights of material are introduced through lines 10 and 11. The polymer leaving through line 14 is polyoxymethylene diacetate at a temperature of 150°–160° C. Dry nitrogen gas at 140° C. and atmospheric pressure is introduced to sparger 15 through line 16. In its passage through sparger 15, the nitrogen picks up substantially all of the acetic anhydride and other volatile materials carried into sparger 15 with the polymer in line 14. The polyoxymethylene diacetate recovered through line 17 represents better than 95% of the total weight of polymer entering the process through line 11.

The acetic anhydride vapors in line 13 are condensed in condenser 18 to a temperature of about 70°–75° C. and passed, along with make-up acetic anhydride, from line 1 into topping still 2. The amount of make-up anhydride represents about 5–10% by weight of the amount in line 10. The topping still is operated at about 2 p.s.i. absolute and at a temperature such that the overhead vapor stream 3 is at 60°–65° C. while the liquid tails stream 4 is at a temperature of about 95° C. The overhead vapor stream 3 is about 50% by weight acetic acid, while the tails stream 4 is about 95% or more by weight acetic anhydride. The refiner 5 is operated at the same pressure as the topping still 2 and at a temperature such that the overhead vapor stream 6 is at 80°–85° C. and the liquid tails stream 7 is about 130° C. This tails stream 7 is substantially all methylene diacetate, while the overhead stream 6 is more than 99% by weight of acetic anhydride, which may be condensed and held in a storage tank or fed directly to vaporizer 9.

It is, of course, apparent to a skilled scientist in this field that with minor changes in operating conditions other anhydrides may be employed. For example, if butyric anhydride were to be used, vapor stream 10 might have to be under a vacuum, or an inert diluent vapor employed along with the anhydride vapors in order to maintain the temperature below 170° C. and yet provide vaporized butyric anhydride. Topping still 2 and refiner 5 would operate at correspondingly different temperatures and pressures than are related in the above description in order to recover and recycle the butyric anhydride.

I claim:

1. A process for esterifying the hydroxyl groups on a polyoxymethylene starting material having a number average molecular weight of at least 10,000 and having at least one of the two ends of its polymer chain terminated by a hydroxyl group, which process comprises passing a continuously flowing stream of vapors of an anhydride of an aliphatic carboxylic acid having 2–6 carbon atoms per acid molecule into contact with said polyoxymethylene starting material in a substantially dry powdery form, and initially at a temperature sufficiently low to cause said anhydride vapors to condense on the surfaces of said polyoxymethylene starting material, the said vapors during the period of contact with said polyoxymethylene consisting essentially of said anhydride and from 0–10% by weight of the carboxylic acid from which said anhydride is derived, the amount of said anhydride being from 0.05 to 5.0 parts by weight per part of said polyoxymethylene, maintaining the said vapors in contact with the said polyoxymethylene as the polyoxymethylene is heated to a temperature of 130°–175° C., and recovering a polyoxymethylene product in which substantially all of the hydroxyl groups in said starting material are converted to ester groups by reaction with said anhydride.

2. A process for esterifying the hydroxyl groups on a polyoxymethylene starting material having a number average molecular weight of at least 10,000 and having at least one of the two ends of its polymer chain terminated by a hydroxyl group, which process comprises passing a continuously flowing stream of vapors of acetic anhydride into contact with said polyoxymethylene starting material in a substantially dry powdery form, and initially at a temperature sufficiently low to cause said acetic anhydride vapors to condense on the surfaces of said polyoxymethylene starting material, the said vapors during the period of contact with said polyoxymethylene consisting essentially of said acetic anhydride and from 0–10% by weight of acetic acid, the amount of said acetic anhydride being from 0.05 to 5.0 parts by weight per part of said polyoxymethylene, maintaining the said vapors in contact with the said polyoxymethylene as the polyoxymethylene is heated to a temperature of 130°–175° C., and recovering a polyoxymethylene product in which substantially all of the hydroxyl groups in said starting material are converted to ester groups by reaction with said acetic anhydride.

References Cited in the file of this patent

UNITED STATES PATENTS

| | | |
|---|---|---|
| 2,768,994 | MacDonald | Oct. 30, 1956 |
| 2,795,571 | Schneider | June 11, 1957 |
| 2,848,437 | Langsdorf et al. | Aug. 19, 1958 |

FOREIGN PATENTS

| | | |
|---|---|---|
| 770,717 | Great Britain | Mar. 20, 1957 |

OTHER REFERENCES

Walker: Formaldehyde, A.C.S. Monograph #120, Reinhold Pub. Corp., New York, N.Y. (1953), pages 133–137.